1

3,096,353
Δ⁹-DEHYDRO-21-HALOETHISTERONES AND THE PROCESS FOR THE PRODUCTION THEREOF

John Fried, Plainfield, and Thomas S. Bry, Elizabeth, N.J., assignors to Merck & Co., Inc., Rahway, N.J., a corporation of New Jersey
No Drawing. Filed Aug. 3, 1961, Ser. No. 128,977
9 Claims. (Cl. 260—397.4)

This invention is concerned generally with novel derivatives of 21-halonorethisterones and their Δ⁵⁽¹⁰⁾-isomers. More particularly, it relates to Δ⁹-dehydro 21- halonorethisterones and their 17-esters; to 3-enol ethers of 21-halonorethisterones, their Δ⁵⁽¹⁰⁾-isomers and Δ⁹-dehydro derivatives, and 17-esters thereof; and to novel processes for preparing these new compounds starting with 3-methoxy-2,5(10)-androstadiene-17-one. The Δ⁹-dehydro-21-halonorethisterones and their 17-esters; and the 3-enol ethers and the 3-enol ether-17-esters of 21-halonorethisterones, their Δ⁵⁽¹⁰⁾-isomers and Δ⁹-dehydro derivatives, subject of the present invention, possess useful therapeutic properties as orally and parenterally active progestational agents.

This application is a continuation-in-part of application Serial No. 99,668, filed March 31, 1961, which, in turn, is a continuation-in-part of application Serial No. 88,575, filed March 2, 1961, now Patent No. 3,072,646.

The 3-enol ethers of 21-halonorethisterone and their Δ⁵⁽¹⁰⁾-isomers (i.e., 17α-haloethynyl-19-nor-3,5-androstadiene-3,17β-diol 3-ether and 17α-haloethynyl-19-nor-3,5(10)-androstadiene-3,17β-diol 3-ether) may be chemically represented as follows:

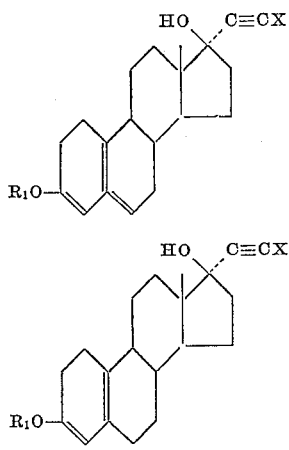

wherein X stands for chloro, bromo or fluoro, and R₁ is a hydrocarbon or substituted hydrocarbon substituent as, for example, an aliphatic or substituted aliphatic radical such as alkyl or aralkyl, more particularly, methyl, ethyl, butyl, amyl, benzyl, a cycloaliphatic or cycoalkyl grouping such as cyclopentyl, cyclohexyl, and the like.

These 3-enol ethers of 21-halonorethisterones and their Δ⁵⁽¹⁰⁾-isomers as well as the intermediate 3-ketones (i.e., 17α-haloethynyl-19-nor-4-androstene-17β-ol - 3 - ones and 17α-haloethynyl - 19 - nor - 5(10) - androstene-17β-ol-3-ones), are prepared, in accordance with the presently invented process, starting with 3-methoxy-19-nor-2,5(10)-androstadiene-17-one which has the following structural formula:

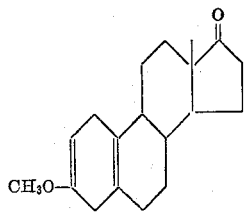

This 3-methoxy-19-nor-2,5(10)-androstadiene - 17 - one is reacted with a haloethyne to form the corresponding 17α-haloethynyl-3-methoxy - 19 - nor-2,5(10)-androstadiene-17β-ol, which has the following structural formula:

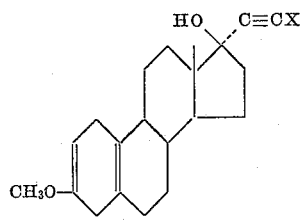

wherein X stands for chloro, bromo, or fluoro.

In a preferred embodiment of this procedure, the haloethyne is formed in situ by the reaction of a 1,2-dihaloethylene (preferably the cis form) and methyl lithium. For example, the 17α-chloroethynyl-3-methoxy-19-nor-2,5(10)-androstadiene-17β-ol is prepared by adding a solution of cis-1,2-dichloroethylene in ether to a solution of methyl lithium at about 0° C. in ether. The reaction mixture is stirred under nitrogen for 1–2 hours, and to the resulting solution containing the chloroethyne is added 3-methoxy-19-nor-2,5(10)-androstadiene-17-one, and stirring is continued for several hours longer.

The 17α-haloethynyl-3-methoxy-19-nor-2,5(10)-androstadiene-17β-ol is converted into the 17α-haloethynyl-17β-hydroxy-19-nor-4-androstene-3-one (i.e., the 21-halonorethisterone) which has the following formula:

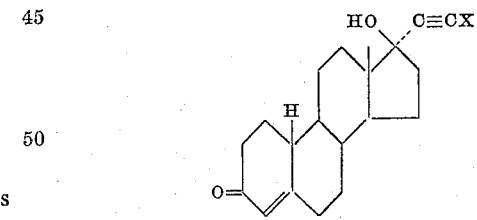

wherein X stands for chloro, bromo or fluoro, by reaction with a strong acid, such as p-toluenesulfonic acid. For example, a mixture of the steroid and p-toluenesulfonic acid in acetone solution is left standing at room temperature overnight.

The 17α-haloethynyl-17β-hydroxy-19-nor-4-androstene-3-ones, their Δ⁵⁽¹⁰⁾-isomers, and 17-esters thereof, may be converted into the corresponding 3-enol ethers (i.e., the 17α-haloethynyl-19-nor - 3,5 - androstadiene - 3,17β - diol 3-ethers and 17α-haloethynyl-19-nor - 3,5(10) - androstadiene-3,17β-diol 3-ethers, and their 17-esters) which have the following formulae:

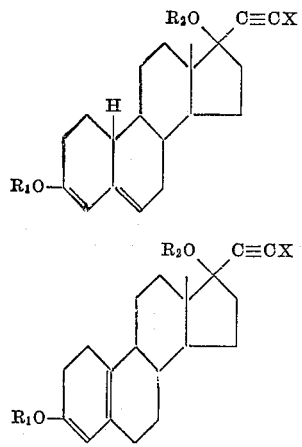

wherein X stands for chloro, bromo, or fluoro, $R_1$ is a hydrocarbon or substituted hydrocarbon substituent as, for example, an aliphatic or substituted aliphatic radical such as alkyl, or aralkyl, more particularly, methyl, ethyl, butyl, amyl, benzyl, a cycloaliphatic or cycloalkyl grouping such as cyclopentyl, cyclohexyl, and the like, and $R_2$ stands for an acyl radical, for example, a lower hydrocarbon carboxylic acyl radical such as benzoyl, a lower alkanoyl radical such as acetyl, propionyl, butyryl, and the like, by stirring together a mixture of the steroid and an alkyl, cycloalkyl or aralkyl orthoformate in dioxane solution in the presence of a strong acid catalyst, for example, organic sulfonic acid.

In a preferred procedure, the novel 17α-haloethynyl-17β-hydroxy-19-nor-4-androstene-3-one 3-enol ethers and 17α-haloethynyl-17β-acyloxy - 19-nor-4-androstene - 3-one 3-enol ethers are prepared by adding an alkyl orthoformate, a cycloalkyl orthoformate, or aralkyl orthoformate, such as ethyl orthoformate, propyl orthoformate, n-butyl orthoformate, cyclopentyl orthoformate, cyclopentyl orthoformate, cyclohexyl orthoformate, benzyl orthoformate, and the like, and an acidic catalyst such as 2,4-dinitrobenzene sulfonic acid, p-toluene-sulfonic acid, and the like, to a solution of the steroid in an organic solvent such as dioxane or preferably the alcohol corresponding to the particular alkyl orthoformate, cycloalkyl orthoformate, or aralkyl orthoformate employed, and stirring the resulting mixtures together at room temperature. The acidic cataylst is then neutralized with a base such as pyridine, and the 17α-haloethynyl-17β-hydroxy-19-nor-4-androstene-3-one 3-enol ether or 17α-haloethynyl-17β-acyloxy-19-nor-4-androstene-3-one 3-enol ether, as for example, 3-alkoxy - 17α-haloethynyl - 19-nor-3,5-androstadiene-17β-ol, such as 3-ethoxy-17α-chloroethynyl-19-nor-3,5-androstadiene-17β-ol; 3-propoxy-17α-fluoroethynyl-19-nor-3,5-androstadiene-17β-ol; 3-n-butoxy-17α-cholroethynyl-19-nor-3,5-androstadiene-17β-ol; 3 - cycloalkoxy-17α-haloethynyl-19-nor-3,5-androstadiene-17β-ol, such as 3-cyclopentyloxy - 17α-chloroethynyl - 19-nor-3,5-androstadiene-17β-ol; 3-benzyloxy-17α-fluoroethynyl - 19-nor-3,5-androstadiene-17β-ol; 3-hexyloxy-17α-chloroethynyl-19-nor-3,5-androstadiene-17β-ol; 3-aralkoxy-17α-haloethynyl-19-nor-3,5-androstadiene-17β-ol, such as 3-benzyloxy-17α-chloroethynyl-19-nor-3,5-androstadiene-17β-ol; 3-benzyloxy-17α-fluoroethynyl-19-nor-3,5-androstadiene-17β-ol; 3-alkoxy - 17α-haloethynyl-17β-alkanoyloxy - 19-nor-3,5-androstadiene, such as 3-ethoxy-17α-chloroethynyl-17β-acetoxy-19-nor-3,5-androstadiene; 3-propoxy-17α-fluoroethynyl- 17β-acetoxy - 19-nor-3,5-androstadiene; 3-n-butoxy-17α-chloroethynyl - 17β-propionoxy-19-nor - 3,5-androstadiene; 3-cycloalkoxy-17α-haloethynyl-17β-alkanoyloxy-19-nor-3,5-androstadiene, such as 3-cyclopentyloxy-17α-chloroethynyl-17β-acetoxy-19-nor-3,5-androstadiene; 3-benzyloxy-17α-fluoroethynyl-17β-butyroxy - 19-nor-3,5-androsta-diene; 3-hexyloxy-17α-chloroethynyl-17β-acetoxy-19-nor-3,5-androstadiene; 3-aralkoxy-17α-haloethynyl-17β-alkanoyloxy-19-nor-3,5-androstadiene, such as 3-benzyloxy-17α-chloroethynyl - 17β-propionoxy - 19-nor-3,5-androstadiene; 3-benzyloxy-17α-fluoroethynyl-17β-acetoxy-19-nor-3,5-androstadiene; and the like, are recovered from the neutralized reaction mixture.

The 17α-haloethynyl-17β-hyrdoxy-19-nor-4-androstene-3-one 3-enol ethers, other than the 3-enol ethyl ethers, are conveniently prepared starting with said 3-enol ethyl ether (e.g., 3-ethoxy-17α-haloethynyl-19-nor-3,5-androstadiene-17β-ol) by mixing together the latter compound and an inert hydrocarbon solvent such as isoctane and an alcohol such as, for example, an aliphatic alcohol such as propanol, n-butyl alcohol, amyl alcohol, a cycloaliphatic alcohol, as for example, a cycloalkanol such as cyclohexanol, cyclopentanol, an araliphatic alcohol, as, for example, an aralkanol such as benzyl alcohol, and the like, and an acidic catalyst such as p-toluenesulfonic acid, and heating the resulting mixture, preferably under reflux, in an apparatus equipped with means for removing the water from the distillate and returning the dry distillate to the reaction mixture. The acid catalyst is then neutralized with a base such as pyridine, and the resulting neutral solution is evaporated to dryness in vacuo to give the 17α-haloethynyl-17β-hydroxy-19-nor-4-androstene 3-enol ether, which is conveniently purified by crystallization from methanol containing traces of pyridine, or by chromotography.

The 6-chloro-17α-haloethynyl-17β-hydroxy-19-nor-4,6-androstadiene-3-one may be prepared in a multiple-step process from the 3-enol ethers of the 17α-haloethynyl-17β-hydroxy-19-nor-4-androstene-3-one by reaction first with N-bromosuccinimide to give 6β-bromo-17α-haloethynyl-17β-hydroxy-19-nor-4-androstene-3-one which has the following formula:

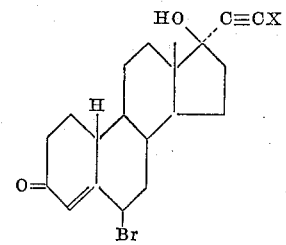

wherein X is chloro, bromo or fluoro. In a preferred procedure, a solution of the steroid and sodium acetate in aqueous acetone is stirred with N-bromosuccinimide and acetic acid at about 0° C.

The 17β-lower alkanoyl esters of 17β-hydroxy-17α-haloethynyl-3-keto-steroids, such as 17β-hydroxy-17α-chloroethynyl - 19-nor-4-androstene-3-one, 17β-hydroxy-17α-bromoethynyl - 19-nor-4-androstene - 3-one, 17β-hydroxy-17α-chloroethynyl - 19-nor-4,9-androstadiene-3-one, 17β-hydroxy - 17α-bromoethynyl - 19-nor - 4,9-androstadiene-3-one, are prepared by the reaction of the 17β-hydroxy-17α-haloethynyl-3-keto-steroid with a lower alkanoic acid anhydride in the presence of an organic base such as pyridine. The lower acid anhydrides which are ordinarily used include acetic anhydride, propionic anhydride, butyric anhydride, and the like.

The 6-bromo-derivative is then dehydrobrominated to introduce a Δ⁶ bond thus forming the 17α-haloethynyl-17β-hydroxy-19-nor-4,6-androstadiene-3-one which has the following formula:

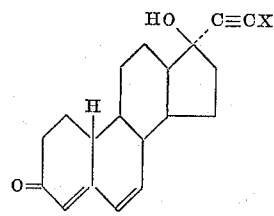

wherein X is chloro, bromo, or fluoro. The dehydrobromination is conveniently brought about by heating a solution of the steroid in a solvent such as dimethylformamide with lithium bromide and lithium carbonate for several hours at about 120° C.

The above compound is then oxidized to the 6α,7α-epoxy-17α-haloethynyl - 17β-hydroxy - 19-nor-4-androstene-3-one which has the following formula:

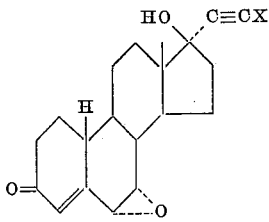

wherein X is chloro, bromo, or fluoro, conveniently by treating a solution of the steroid in a solvent such as benzene with perbenzoic acid in the dark at room temperature for about 60–70 hours.

A solution of the 6α,7α-epoxy-17α-haloethynyl-17β-hydroxy-19-nor-4-androstene-3-one in an organic solvent is treated with CHCl₃ at room temperature to form 6-chloro-17α-haloethynyl - 17β-hydroxy - 19-nor-4,6-androstadiene-3-one which has the following formula:

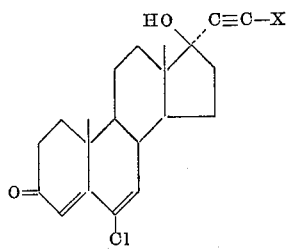

wherein X is chloro, bromo, or fluoro.

The 17α-haloethynyl-3-methoxy-19-nor-2,5(10)-androstadiene-17β-ol may be converted into 17α-haloethynyl-17β-hydroxy-19-nor-5(10)-androstene-3-one which has the following formula:

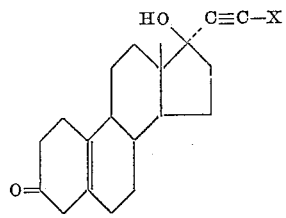

wherein X stands for chloro, bromo, or fluoro, by reaction with a weak organic acid such as acetic acid. For example, a mixture of the steroid and glacial acetic acid in an aqueous solution of absolute ethanol and dioxane is left standing at room temperature for several hours.

The 17α-haloethynyl-17β-hydroxy-19-nor-4,9-androstadiene-3-one which has the following formula:

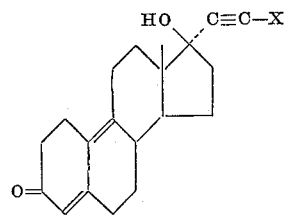

wherein X stands for chloro, bromo or fluoro, may be prepared by treatment of 17α-haloethynyl-17β-hydroxy-19-nor-5(10)-androstene-3-one with approximately one equivalent of bromine in pyridine solution, or with pyridine perbromide hydrobromide.

The following examples illustrate methods of carrying out the present invention, but it is to be understood that these examples are given for purposes of illustration and not of limitation.

Example 1

A solution consisting of 1.7 g. (1.32 cc.) of cis-1,2-dichloroethylene in 10 cc. of sodium-dried ether is added over 0.5 hour at 0° C. to 3 cc. of a 1.4 N-solution of methyl lithium (prepared by adding lithium to methyl iodide in dry ether solution under nitrogen at about 10° C.) in 25 cc. of sodium-dried ether. The reaction mixture is stirred at room temperature under nitrogen for an additional 1½ hours, followed by the addition, over a 15-minute period, of 100 mg. of 3-methoxy-19-nor-2,5(10)-androstadiene-17-one in 4 cc. of sodium-dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α-chloroethynyl-3-methoxy - 19-nor-2,5(10)-androstadiene-17β-ol, M.P. 112–115° C.

I.R. $\lambda_{max.}^{Nujol}$ 2.80, 4.48, 6.02, 6.12μ

*Analysis*: (Calculated for $C_{21}H_{27}O_2Cl$): C, 72.71; H, 7.85. Found: C, 72.85; H, 8.13. $[\alpha]_D^{26°}$ +68.6° (C=1 in dioxane).

In accordance with the above procedures, but using 1,2-dibromoethylene in place of 1,2-dichloroethylene, there is obtained the 17α-bromoethynyl-3-methoxy-19-nor-2,5-(10)-androstadiene-17β-ol.

In accordance with the above procedure, but using 1-chloro-2-fluoroethylene in place of 1,2-dichloroethylene, there is obtained a mixture of the 17α-chloroethynyl and the 17α-fluoroethynyl-3-methoxy-19-nor-2,5(10)-androstadiene-17β-ol, which compounds are separated by chromatography.

Example 2

A solution consisting of 10 mg. of 17α-chloroethynyl-3-methoxy-19-nor-2,5(10)-androstadiene-17β-ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α - chloroethynyl-17β-hydroxy-19-nor-4-androstene-3-one, M.P. 185–190° C., I.R. $\lambda_{max.}^{Nujol}$ 2.95, 4.50, 6.10, 6.21μ upon further recrystallization, M.P. 198–201° C.

In accordance with the above procedure, but starting with the 17α-bromoethynyl- or 17α-fluoroethynyl-3-methoxy-19-nor-2,5(10)-androstadiene-17β-ol in place of the 17α-chloroethynyl-3-methoxy-19-nor-2,5(10)-androstadiene-17β-ol there is obtained as products the corresponding 17α-bromoethynyl- or 17α-fluoroethynyl-17β-hydroxy-19-nor-4-androstene-3-one.

Example 3

To a solution of 100 mg. of 17α-chloroethynyl-17β-hydroxy-19-nor-4-androstene-3-one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α chloroethynyl-19-nor-3,5-androstadiene-17β-ol.

I.R. $\lambda_{max.}^{Neat}$ 2.86, 4.50, 6.05, 6.15μ

In accordance with the above procedure, but starting with the 17α-bromoethynyl- or the 17α-fluoroethynyl-17β-hydroxy-19-nor-4-androstene-3-one in place of the 17α-chloroethynyl - 17β - hydroxy-19-nor-4-androstene-3-one there are obtained as products the corresponding 17α-bromoethynyl- or the 17α-fluoro-ethynyl-3-ethoxy-19-nor-3,5-androstadiene-17β-ol.

*Example 4*

A mixture of 100 mg. of 17α-chloroethynyl-17β-hydroxy-19-nor-4-androstene-3-one, 0.06 g. of 2,4-dinitrobenzenesulfonic acid, 3 ml. of dry dioxane and 0.25 ml. of freshly distilled n-butyl orthoformate are stirred overnight at 30° C. The acid catalyst is then neutralized by addtiion of 0.1 ml. of pyridine. The reaction mixture is diluted with water and extracted with ether. The combined ether extracts are washed with water, dried and evaporated under reduced pressure. The residue is chromatographed over alumina (alkaline) and eluted with mixtures of ether and petroleum ether to separate 3-butoxy-17α-chloroethynyl-19-nor-3,5-androstadiene - 17β-ol.

In accordance with the above procedure, but starting with the 17α-bromoethynyl- or the 17α-fluoroethynyl-17β-hydroxy-19-nor-4-androstene-3-one in place of the 17α-chloroethynyl - 17β - hydroxy-19-nor-4-androstene-3-one there are obtained as products the corresponding 17α-bromoethynyl- or the 17α-fluoroethynyl-3-butoxy-19-nor-3,5-androstadiene-17β-ol.

*Example 5*

A solution consisting of 1 g. of 3-ethoxy-17α-chloroethynyl-19-nor-3,5-androstadiene-17β-ol, 700 mg. of sodium acetate, 5 ml. of water and 40 ml. of acetone is cooled to 0° C. and 1.07 g. of N-bromosuccinimide and 0.83 ml. of acetic acid is added. The mixture is stirred for 3 hours at 0.5° C. and then poured into water to yield the 6β-bromo-17α-chloroethynyl-17β-hydroxy-19-nor-4-androstene-3-one.

Treatment of 6β-bromo-17α-chloroethynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C., follower by dilution with ice water and filtration affords 17α-chloroethynyl - 17β - hydroxy-19-nor-4,6-androstadiene-3-one.

A solution consisting of 675 mg. of 17α-chloroethynyl-17β-hydroxy-19-nor-4,6-androstadiene-3-one, 30 ml. of 0.2 N-perbenzoic acid dissolved in benzene and 30 ml. of ether is allowed to stand at room temperature in the dark for 68 hours. The resulting benzene-ether solution is washed with acidified sodium bisulfite solution, water, 2.5 N-potassium hydroxide solution, and again with water. The washed benzene-ether reaction solution is dried and evaporated in vacuo to give 6α,7α-epoxy-17α-chloroethynyl-17β-hydroxy-19-nor-4-androstene-3-one.

The 6α,7α-epoxy - 17α - chloroethynyl-17β-hydroxy-19-nor-4-androstene-3-one is dissolved in 20 ml. of a 0.4 N solution of hydrogen chloride in chloroform, and the resulting solution is allowed to stand for 5.5 hours at room temperature. The reaction solution is then poured into iced sodium bicarbonate solution. The aqueous mixture is extracted with chloroform, and the chloroform extract is evaporated to dryness in vacuo. The residual material is chromatographed on acid-washed alumina (20 g.) and eluted with ether-petroleum ether mixtures to give 6-chloro - 17α - chloroethynyl - 17β - hydroxy - 19 - nor-4,6-androstadiene-3-one.

In accordance with the above procedures, but starting with the 3-ethoxy-(17α-bromoethynyl- or 17α-fluoroethynyl)-19-nor-3,5-androstadiene-17β-ol in place of the 3-ethoxy-17α-chloroethynyl-19-nor-3,5-androstadiene-17β-ol there are obtained as products the corresponding 6-chloro-(17α-bromo-ethynyl- or 17α-fluoroethynyl)-17β-hydroxy-19-nor-4,6-androstadiene-3-one.

*Example 6*

To a solution of 160 mg. of 17α-chloroethynyl-3-methoxy-19-nor-2,5(10)-androstadiene-17β-ol in 1.6 cc. of dioxane and 7.2 cc. of absolute ethanol is added 3.2 cc. of glacial acetic acid, and immediately thereafter, 1.6 cc. of water. This reaction mixture is left standing at room temperature for 5 hours. It is then poured into an ice/sodium bicarbonate solution, allowed to stand until the mixture is basic and extracted with benzene. The benzene extracts are washed with water until the washings are only slightly basic and then dried over anhydrous potassium carbonate, filtered and concentrated in vacuo using a water bath at 30–50° C. By crystallization of the residual material from ether, about 90 mg. of 17α-chloroethynyl-17β-hydroxy-19-nor-5(10)-androstene-3-one is obtained. U.V. no max.;

I.R. $\lambda_{max}^{Nujol}$ 2.98, 4.50, 5.90μ

In accordance with the above procedures, but starting with the 17α-bromoethynyl- or the 17α-fluoroethynyl-3-methoxy-19-nor-2,5(10)-androstadiene-17β-ol in place of the 17α-chloroethynyl-3-methoxy-19-nor-2,5(10)-androstadiene-17β-ol there are obtained as products the corresponding 17α-bromoethynyl- or 17α-chloroethynyl-17β-hydroxy-19-nor-5(10)-androstene-3-one.

*Example 7*

To 100 mg. of 17α-chloroethynyl-17β-hydroxy-19-nor-5(10)-androstene-3-one in 5 cc. of pyridine is added one equivalent of bromine. The reaction mixture is stirred for two hours at room temperature, poured into ice water and the aqueous mixture extracted with ether. The ether extract is washed with water, dried over sodium sulfate, and concentrated in vacuo to yield 17α-chloroethynyl-17β-hydroxy-19-nor-4,9-androstadiene-3-one.

In accordance with the above procedures, but starting with the 17α-bromoethynyl- or the 17α-fluoroethynyl-17β-hydroxy-19-nor-5(10)-androstene-3-one in place of the 17α-chloroethynyl-17β-hydroxy-19-nor-5(10)-androstene-3-one there are obtained as products the corresponding 17α-bromoethynyl- or the 17α-fluoroethynyl-17β-hydroxy-19-nor-4,9-androstadiene-3-one.

*Example 8*

To 100 mg. of 17α-chloroethynyl-17β-hydroxy-19-nor-5(10)-androstene-3-one in 5 cc. of pyridine is added one equivalent of bromine. The reaction mixture is stirred for fifteen hours at room temperature, poured into ice water and the aqueous mixture extracted with ether. The ether extract is washed with water, dried over sodium sulfate, and concentrated in vacuo to yield 17α-chloroethynyl-17β-hydroxy-19-nor-4,9-androstadiene-3-one.

In accordance with the above procedures, but starting with the 17α-bromoethynyl- or the 17α-fluoroethynyl-17β-hydroxy-19-nor-5(10)-androstene-3-one in place of the 17α-chloroethynyl-17β-hydroxy-19-nor-5(10)-androstene-3-one there are obtained as products the corresponding 17α-bromoethynyl- or the 17α-fluoroethynyl-17β-hydroxy-19-nor-4,9-androstadiene-3-one.

*Example 9*

A mixture of 50 mg. of 3-ethoxy-17α-chloroethynyl-19-nor-3,5-androstadiene-17β-ol, 5.5 ml. of isooctane, 25 mg. of cyclohexanol and 2.5 mg. of p-toluenesulfonic acid is heated under reflux for a period of approximately 32 hours in an apparatus providing for the separation of water from the condensate before return to the refluxing mixture. The reaction mixture is cooled, 0.1 ml. of pyridine is added to neutralize the p-toluenesulfonic acid catalyst, and the liquid is completely evaporated in vacuo to dryness to give as the residual product 3-cyclohexyloxy-17α-chloroethynyl-19-nor-3,5-androstadiene-17β-ol.

In accordance with the above procedure, but starting with 3-ethoxy-17α - bromoethynyl - 19 - nor - 3,5 - androstadiene-17β-ol in place of the 3 - ethoxy - 17α - chloroethynyl-19-nor-3,5-androstadiene-17β-ol, there is obtained as product the corresponding 3-cyclohexyloxy-17α-bromoethynyl-19-nor-3,5-androstadiene-17β-ol. Similarly, when 3-ethoxy-17α-fluoroethynyl - 19 - nor - 3,5 - androstadiene-17β-ol is utilized as starting material in the foregoing procedure, there is obtained as product the corresponding 3-cyclohexyloxy-17α-fluoroethynyl - 19 - nor - 3,5 - androstadiene-17β-ol.

Example 10

A mixture of 50 mg. of 3-ethoxy-17α-chloroethynyl-19-nor-3,5-androstadiene-17β-ol, 5.5 ml. of isooctane, 25 mg. of n-butanol and 2.5 mg. of p-toluenesulfonic acid is heated under reflux for a period of approximately 32 hours in an apparatus providing for the separation of water from the condensate before return to the refluxing mixture. The reaction mixture is cooled, 0.1 ml. of pyridine is added to neutralize the p-toluenesulfonic catalyst, and the liquid is completely evaporated to dryness in vacuo to give as the residual product 3-n-butoxy-17α-chloroethynyl-19-nor-3,5-androstadiene-17β-ol.

In accordance with the above procedure, but starting with 3-ethoxy - 17α - bromoethynyl-19-nor-3,5-androstadiene-17β-ol in place of the 3-ethoxy-17α-chloroethynyl-19-nor-3,5-androstadiene-17β-ol, there is obtained as product the corresponding 3-n-butoxy-17α-bromoethynyl-19-nor-3,5-androstadiene-17β-ol. Similarly, when 3-ethoxy-17α-fluoroethynyl-19-nor-3,5-androstadiene-17β-ol is utilized as starting material in the foregoing procedure, there is obtained as product the corresponding 3-n-butoxy-17α-fluoroethynyl-19-nor-3,5-androstadiene-17β-ol.

Example 11

A mixture of 50 mg. of 3-ethoxy-17α-chloroethynyl-19-nor-3,5-androstadiene-17β-ol, 5.5 ml. of isooctane, 25 mg. of cyclopentanol and 2.5 mg. of p-toluenesulfonic acid is heated under reflux for a period of approximately 32 hours in an apparatus providing for the separation of water from the condensate before return to the refluxing mixture. The reaction mixture is cooled, 0.1 ml. of pyridine is added to neutralize the p-toluenesulfonic catalyst, and the liquid is completely evaporated in vacuo to dryness to give as the residual product 3-cyclopentyloxy-17α-chloroethynyl-19-nor-3,5-androstadiene-17β-ol.

In accordance with the above procedure, but starting with 3-ethoxy - 17α - bromoethynyl-19-nor-3,5-androstadiene-17β-ol in place of the 3-ethoxy-17α-chloroethynyl-19-nor-3,5-androstadiene-17β-ol, there is obtained as product the corresponding 3-cyclopentyloxy-17α-bromoethynyl-19-nor - 3,5 - androstadiene-17β-ol. Similarly, when 3-ethoxy-17α-fluoroethynyl-19-nor-3,5-androstadiene-17β-ol is utilized as starting material in the foregoing procedure, there is obtained as product the corresponding 3-cyclopentyloxy - 17α - fluoroethynyl-19-nor-3,5-androstadiene-17β-ol.

Example 12

A mixture of 50 mg. of 3-ethoxy-17α-chloroethynyl-19-nor-3,5-androstadiene-17β-ol, 5.5 ml. of isooctane, 25 mg. of benzyl alcohol and 2.5 mg. of p-toluenesulfonic acid is heated under reflux for a period of approximately 32 hours in an apparatus providing for the separation of water from the condensate before return to the refluxing mixture. The reaction mixture is cooled, 0.1 ml. of pyridine is added to neutralize the p-toluenesulfonic catalyst, and the liquid is completely evaporated in vacuo to dryness to give as the residual product 3-benzyloxy-17α-chloroethynyl-19-nor-3,5-androstadiene-17β-ol.

In accordance with the above procedure, but starting with 3-ethoxy-17α-bromoethynyl-19-nor-3,5-androstadiene-17β-ol in place of the 3-ethoxy-17α-chloroethynyl-19-nor-3,5-androstadiene-17β-ol, there is obtained as product the corresponding 3-benzyloxy-17α-bromoethynyl-19-nor-3,5-androstadiene-17β-ol. Similarly, when 3-ethoxy-17α-fluoroethynyl-19-nor-3,5-androstadiene-17β-ol is utilized as starting material in the foregoing procedure, there is obtained as product the corresponding 3-benzyloxy-17α-fluoroethynyl-19-nor-3,5-androstadiene-17β-ol.

Example 13

One-hundred mg. of 17α-chloroethynyl-17β-hydroxy-19-nor-4,9-androstadiene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-chloroethynyl-19-nor-4,9-androstadiene-3-one.

Example 14

One-hundred mg. of 3-cyclopentyloxy-17α-chloroethynyl-19-nor-3,5-androstadiene-17β-ol is heated with 1 cc. of acetic anhydride and 1.2 cc. of pyridine on the steam bath overnight. The reaction mixture is then poured onto ice and extracted with chloroform. The extract is chromatographed over acid-washed alumina and eluted with mixtures of ether and petroleum ether to give 3-cyclopentyloxy - 17β - acetoxy-17α-chloroethylnyl-19-nor - 3,5 - androstadiene.

Example 15

A mixture of 736 mg. of 17α-chloroethynyl-19-nor-4-androstene-17β-ol-3-one, 2.1 g. of cyclopentyl orthoformate, 7.4 ml. of cyclopentanol and 30 mg. of p-toluenesulfonic acid is stirred under an atmosphere of nitrogen for a period of 3.5 hours. The reaction mixture poured into ice-cold aqueous sodium bicarbonate solution, and the aqueous mixture extracted with ethyl ether. The ethyl ether extract is separated, dried, and evaporated to dryness in high vacuum at a temperature not exceeding 50° C. to give 3-cyclopentyloxy-17α-chloroethynyl-19-nor-3,5-androstadiene-17β-ol which is purified by chromatography on silicia gel.

In accordance with the above procedure, but starting with 17α-bromoethynyl-19-nor-4-androstene-17β-ol-3-one in place of the 17α-chloroethynyl-19-nor-4-androstene-17β-ol-3-one, there is obtained as product the corresponding 3-cyclopentyloxy - 17α - bromoethynyl-19-nor-3,5-androstadiene-17β-ol. And similarly, when 17α-fluoroethynyl-19-nor-4-androstene-17β-ol-3-one is utilized as starting material in the foregoing procedure, there is obtained as product the corresponding 3-cyclopentyloxy-17α-fluoroethynyl-19-nor-3,5-androstadiene-17β-ol.

Example 16

A mixture of 736 mg. of 17α-chloroethynyl-19-nor-4,9-androstadiene-17β-ol-3-one, 2.1 g. of cyclopentyl orthoformate, 7.4 ml. of cyclopentanol and 30 mg. of p-toluenesulfonic acid is stirred under an atmosphere of nitrogen for a period of 3.5 hours. The reaction mixture is poured into ice-cold aqueous sodium bicarbonate solution, and the aqueous mixture extracted with ethyl ether. The ethyl ether extract is separated, dried, and evaporated to dryness in high vacuum at a temperature not exceeding 50° C. to give 17α-chloroethynyl-19-nor-4,9-androstadiene-17β-ol-3-one-3-cyclopentyl enol ether which is purified by chromatography on silica gel.

Various changes and modifications may be made in carrying out the present invention without departing from the spirit and scope thereof. Insofar as these changes and modifications are within the purview of the annexed claims, they are to be considered as part of our invention.

We claim:
1. 17α - haloethynyl - 17β - hydroxy - 19-nor-4,9(10)-androstadiene-3-one.
2. 17α - haloethynyl - 17β - acyloxy - 19 - nor-4,9(10)-androstadiene-3-one.
3. 17α - haloethynyl - 17β - hydroxy - 19 - nor-4,9(10)-androstadiene-3-one 3-enol ether.

4. 17α-haloethynyl-17β-acyloxy-19-nor-4,9(10)-androstadiene-3-one 3-enol ether.

5. 17α-chloroethynyl-17β-hydroxy-19-nor-4,9(10)-androstadiene-3-one.

6. 17α-chloroethynyl-17β-acetoxy-19-nor-4,9(10)-androstadiene-3-one.

7. 17α-chloroethynyl-17β-hydroxy-19-nor-4,9(10)-androstadiene-3-one 3-cyclopentyl enol ether.

8. 17α-chloroethynyl-17β-acetoxy-19-nor-4,9(10)-androstadiene-3-one 3-cyclopentyl enol ether.

9. The process for the preparation of 17α-haloethynyl-17β-hydroxy-19-nor-4,9(10)-androstadiene-3-one which comprises reacting 17α-haloethynyl-17β-hydroxy-19-nor-5(10)-androstene-3-one with approximately one equivalent weight of bromine in pyridine solution.

No references cited.